United States Patent
Kawai et al.

(10) Patent No.: US 11,360,978 B2
(45) Date of Patent: Jun. 14, 2022

(54) SEARCH DEVICE, TAG GENERATION DEVICE, QUERY GENERATION DEVICE, SEARCHABLE ENCRYPTION SYSTEM AND COMPUTER READABLE MEDIUM

(71) Applicant: Mitsubishi Electric Corporation, Tokyo (JP)

(72) Inventors: Yutaka Kawai, Tokyo (JP); Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 246 days.

(21) Appl. No.: 16/499,781

(22) PCT Filed: May 18, 2017

(86) PCT No.: PCT/JP2017/018727
§ 371 (c)(1),
(2) Date: Sep. 30, 2019

(87) PCT Pub. No.: WO2018/211670
PCT Pub. Date: Nov. 22, 2018

(65) Prior Publication Data
US 2020/0065305 A1  Feb. 27, 2020

(51) Int. Cl.
*G06F 16/2453* (2019.01)
*G06F 16/242* (2019.01)
*G06F 21/60* (2013.01)

(52) U.S. Cl.
CPC ...... *G06F 16/24542* (2019.01); *G06F 16/242* (2019.01); *G06F 21/602* (2013.01)

(58) Field of Classification Search
CPC ............. G06F 16/24542; G06F 16/242; G06F 21/602; G06F 21/6227; G06F 2221/2107; G06F 21/6245; H04L 2209/42; H04L 9/00
See application file for complete search history.

(56) References Cited

U.S. PATENT DOCUMENTS 8,874,930 B2   10/2014   Chase et al.
2012/0297201 A1   11/2012   Matsuda et al.
(Continued)

FOREIGN PATENT DOCUMENTS

JP    2012-164031 A    8/2012
JP    2013-145420 A    7/2013
(Continued)

OTHER PUBLICATIONS

Curtmola et al., "Searchable Symmetric Encryption: Improved Definitions and Efficient Constructions," 13th ACM Conference on Computer and Communications Security (CCS '06), 2006, pp. 1-33.
Fujiwara et al., "Searchable Encryption Database System for Large-scale Data," Japan Association for Medical Informatics, Nov. 1, 2015, pp. 564-566.
(Continued)

*Primary Examiner* — Albert M Phillips, III
(74) *Attorney, Agent, or Firm* — Birch, Stewart, Kolasch & Birch, LLP

(57) ABSTRACT

A search device (60) determines whether or not an auxiliary tag AT corresponding to an auxiliary query AQ obtained by conversion of a keyword exists, among auxiliary tags AT stored in an auxiliary tag storage unit (632) and obtained by conversion of a search word. When it is determined that the auxiliary tag AT corresponding to the auxiliary query AQ exists, the search device (60) specifies an encryption tag ET corresponding to a search query SQ being set with attribute information x indicating an attribute of a user, and the keyword, among encryption tags ET stored in an encryption tag storage unit (633) and being set with an access condition v indicating an accessible attribute, and the search word.

6 Claims, 19 Drawing Sheets

(56) References Cited

U.S. PATENT DOCUMENTS

| | | |
|---|---|---|
| 2013/0262863 A1 | 10/2013 | Yoshino et al. |
| 2013/0287210 A1 | 10/2013 | Matsuda et al. |
| 2014/0331044 A1 | 11/2014 | Fujii et al. |
| 2015/0039903 A1 | 2/2015 | Cash et al. |
| 2016/0344707 A1 | 11/2016 | Philipp |
| 2017/0242924 A1 | 8/2017 | Cash et al. |
| 2019/0020630 A1 | 1/2019 | Philipp |

FOREIGN PATENT DOCUMENTS

| | | |
|---|---|---|
| JP | 5412414 B2 | 2/2014 |
| JP | 5816299 B2 | 11/2015 |
| JP | 5948060 B2 | 7/2016 |
| WO | WO 2011/086687 A1 | 7/2011 |
| WO | WO 2012/095973 A1 | 7/2012 |
| WO | WO 2013/080365 A1 | 6/2013 |
| WO | WO 2015/063905 A1 | 5/2015 |
| WO | WO 2016/002198 A1 | 1/2016 |

OTHER PUBLICATIONS

International Search Report (PCT/ISA/210) issued in PCT/JP2017/018727, dated Aug. 8, 2017.
Kawai et al., "Efficient Symmetric-Key Predicate Encryption for Equality Matching," 2017 Nen Symposium on Cryptography and Information Security, Jan. 24, 2017, pp. 1-6.
Matsuda et al., "Efficient Searchable Encryption and Its Application to Web Services," (DICOM02013), 2013, pp. 2067-2074.
Notice of Reasons for Refusal issued in Japanese Patent Application No. 2017-568318, dated Feb. 27, 2018.
Office Action issued in corresponding EP Application No. 17909889.2 dated Sep. 22, 2020.
Bringer et al., "Error-Tolerant Searchable Encryption," IEEE International Conference on Communications (IEEE ICC 2009), Jun. 14, 2009, pp. 1-6, XP031505978.
Cash et al., "Highly-Scalable Searchable Synunetric Encryption with Support for Boolean Queries," International Association for Cryptoligoc Research (Crypto'2013), vol. 20130816:211344, Aug. 16, 2013, pp. 1-45, XP061008014.
Extended European Search Report, dated Jan. 17, 2020, for European Application No. 17909889.2.

SEARCH DEVICE, TAG GENERATION DEVICE, QUERY GENERATION DEVICE, SEARCHABLE ENCRYPTION SYSTEM AND COMPUTER READABLE MEDIUM

TECHNICAL FIELD

The present invention relates to a searchable encryption technique capable of executing search processing in a state where data is encrypted.

BACKGROUND ART

In recent years, there has been cloud computing technology that uses computing resources in a network, particularly the Internet, to execute and provide various services. As an example of such services, a service may be possible in which various types of data are stored on a network, and only a searcher who is permitted to use the data downloads and uses the data.

However, among the pieces of data stored on the network, there may be data such as personal information of the user that must be kept confidential so as not to leak to a third party. Such data can be kept confidential by encryption such as private key encryption or public key encryption.

As described above, by storing encrypted data on the network, it is possible to achieve both confidentiality of data and the use of cloud computing. However, there is a problem that data that is encrypted cannot be searched for. A searchable encryption technique is available as a technique for solving this problem. With the searchable encryption technique, encrypted data can be searched for by use of a special encryption method.

In the searchable encryption technique, it is essential that a searching user can access only searchable information.

Patent Literature 1 and Non-Patent Literature 1 describe searchable encryption techniques that can control access by using a public key encryption technique such as ID-based encryption or inner-product predicate encryption. Non-Patent Literature 2 describes a searchable encryption technique that uses a common key

CITATION LIST

Patent Literature

Patent Literature 1: Japanese Patent Application No. 2011-549822

Non-Patent Literature

Non-Patent Literature 1: Nori MATSUDA, Takashi ITO, Hideya SHIBATA, Mitsuhiro HATTORI, and Takato HIRANO. "Efficient Searchable Encryption and Its Application to Web Services", In DICOMO 2013 (DS-2), 2013.
Non-Patent Literature 2: R. Curtmola, J. Garay, S. Kamara, and R. Ostrovsky. "Searchable Symmetric Encryption: Improved Definitions and Efficient Constructions". ACM CCS 2006.

SUMMARY OF INVENTION

Technical Problem

The searchable encryption techniques described in Patent Literature 1 and Non-Patent Literature 1 are known for requiring a long search processing time. Although the searchable encryption technique described in Non-Patent Literature 2 is faster in search processing than the searchable encryption techniques described in Patent Literature 1 and Non-Patent Literature 1, the technique of Non-Patent Literature 2 is not capable of cryptographic access control.

An object of the present invention is to make it possible to shorten processing time required for search while realizing flexible access control.

Solution to Problem

A search device according to the present invention includes:

an auxiliary collation unit to determine whether or not an auxiliary tag corresponding to an auxiliary query obtained by conversion of a keyword exists, among auxiliary tags stored in an auxiliary tag storage unit and obtained by conversion of a search word; and a main collation unit to specify, when it is determined by the auxiliary collation unit that the auxiliary tag corresponding to the auxiliary query exists, an encryption tag corresponding to a search query being set with attribute information indicating an attribute of a user, and the keyword, among encryption tags stored in an encryption tag storage unit and being set with an access condition indicating an accessible attribute, and the search word.

Advantageous Effects of Invention

In the present invention, before searching for an encryption tag corresponding to a search query, it is determined whether or not an auxiliary tag corresponding to an auxiliary query exists. Hence, in cases where an auxiliary tag corresponding to the auxiliary query does not exist, it is unnecessary to execute time-consuming processing of searching for the encryption tag corresponding to the search query, so that a processing time for search can be shortened. Also, as for the encryption tag corresponding to the search query, flexible access control can be performed.

DESCRIPTION OF EMBODIMENTS

Embodiment 1

\*\*\*Description of Configuration\*\*\*

Figure 1:
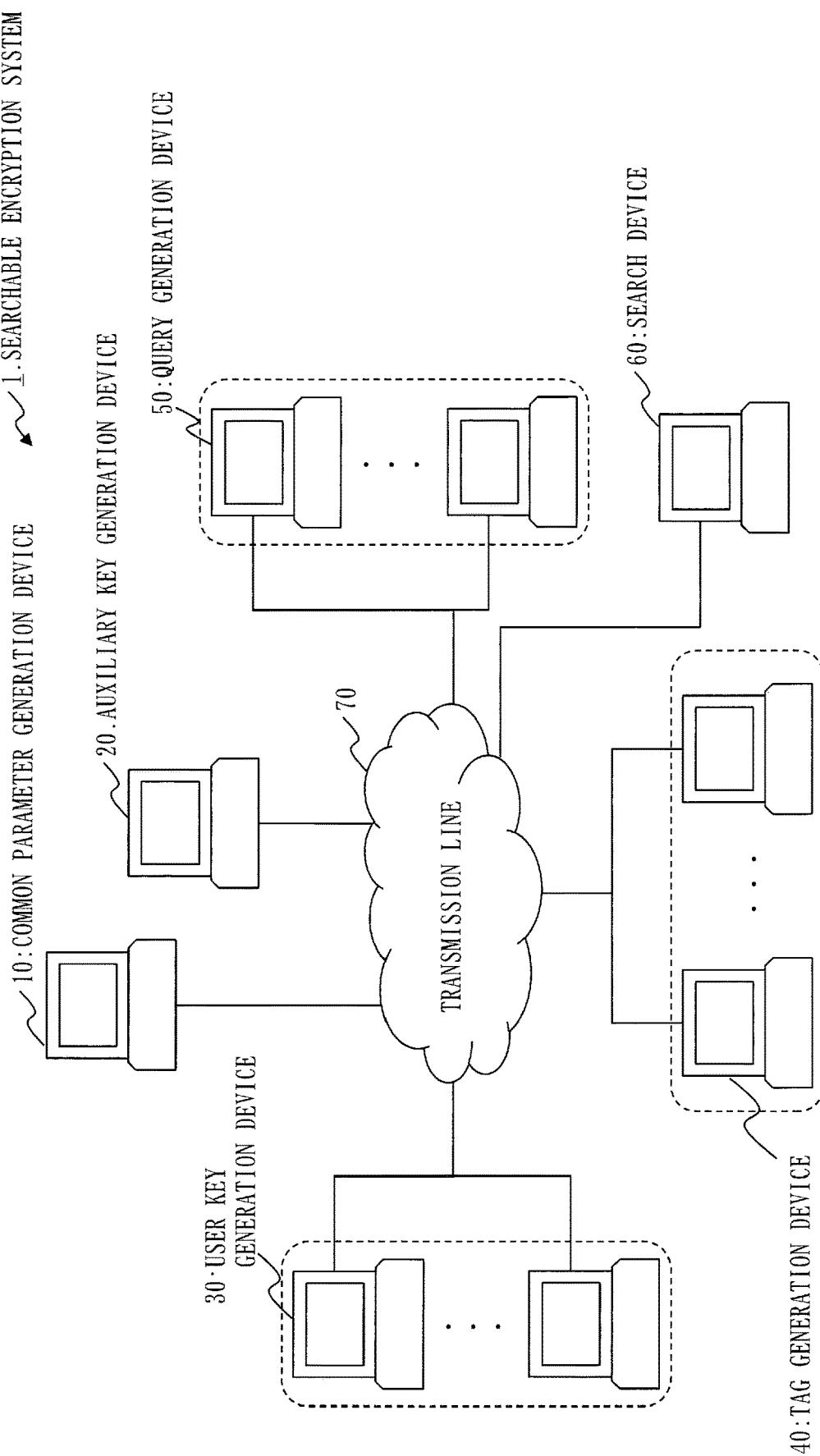
FIG. 1 is a configuration diagram of a searchable encryption system 1 according to Embodiment 1.

A configuration of a searchable encryption system 1 according to Embodiment 1 will be described referring to FIG. 1.

The searchable encryption system 1 is provided with a common parameter generation device 10, an auxiliary key generation device 20, at least one user key generation device 30, at least one tag generation device 40, at least one query generation device 50, and a search device 60.

The common parameter generation device 10, the auxiliary key generation device 20, each user key generation device 30, each tag generation device 40, each query generation device 50, and search device 60 are connected to each other via a transmission line 70. A specific example of the transmission line 70 is the Internet or a local area network (LAN).

At least two or more out of the common parameter generation device 10, the auxiliary key generation device 20, and the user key generation device 30 may be implemented as one device. One device may be provided with both functions of the tag generation device 40 and the query generation device 50.

Figure 2:
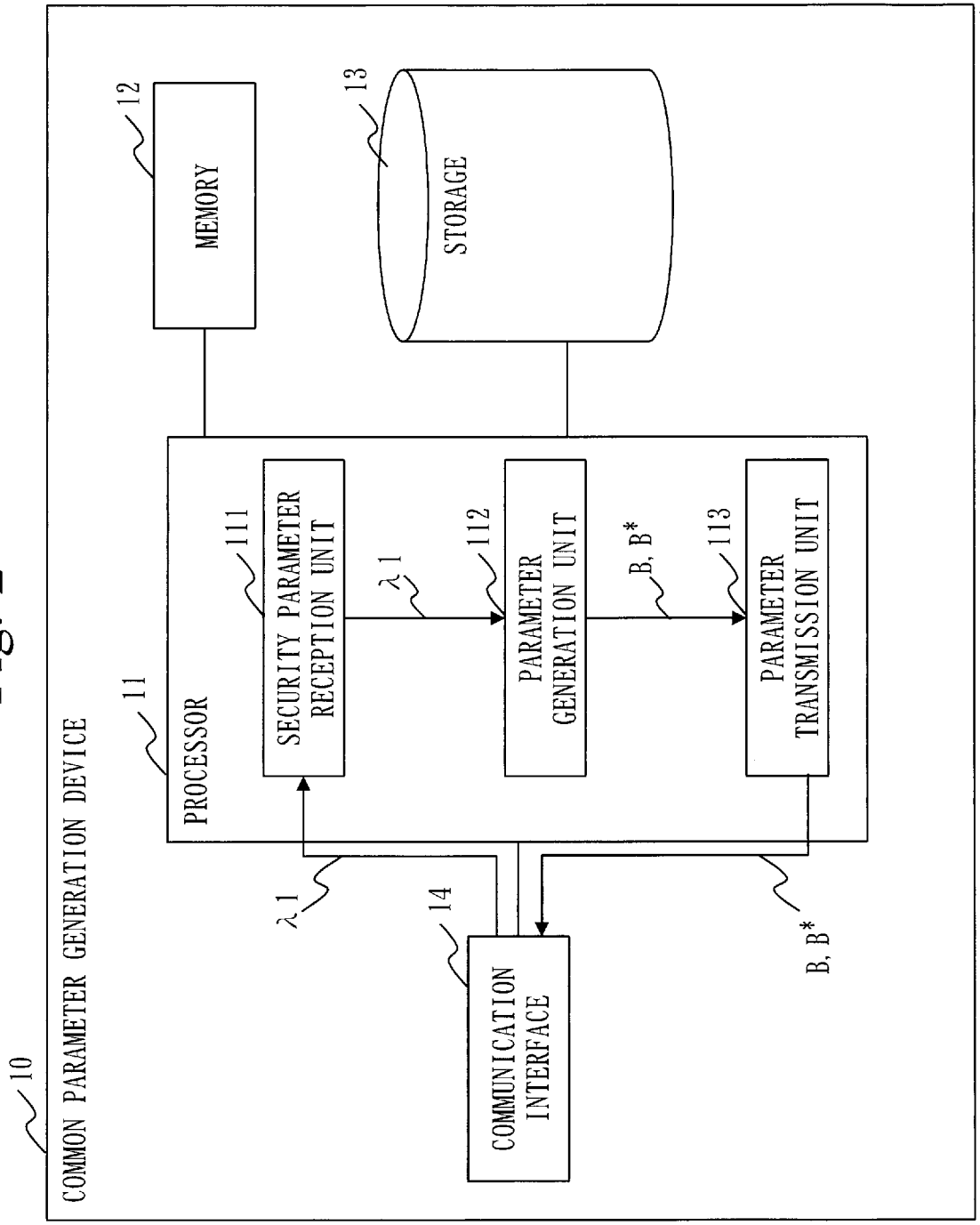
FIG. 2 is a configuration diagram of a common parameter generation device 10 according to Embodiment 1.

A configuration of the common parameter generation device 10 according to Embodiment 1 will be described referring to FIG. 2.

The common parameter generation device 10 is a computer.

The common parameter generation device 10 is provided with hardware devices which are a processor 11, a memory 12, a storage 13, and a communication interface 14. The processor 11 is connected to the other hardware devices via signal lines and controls these other hardware devices.

The common parameter generation device 10 is provided with a security parameter reception unit 111, a parameter generation unit 112, and a parameter transmission unit 113, as functional configuration elements. Functions of the functional configuration elements of the common parameter generation device 10 are implemented by software.

A program that implements the functions of the functional configuration elements of the common parameter generation device 10 is stored in the storage 13.

This program is read to the memory 12 by the processor 11 and executed by the processor 11. The functions of the functional configuration elements of the common parameter generation device 10 are thus implemented.

Figure 3:
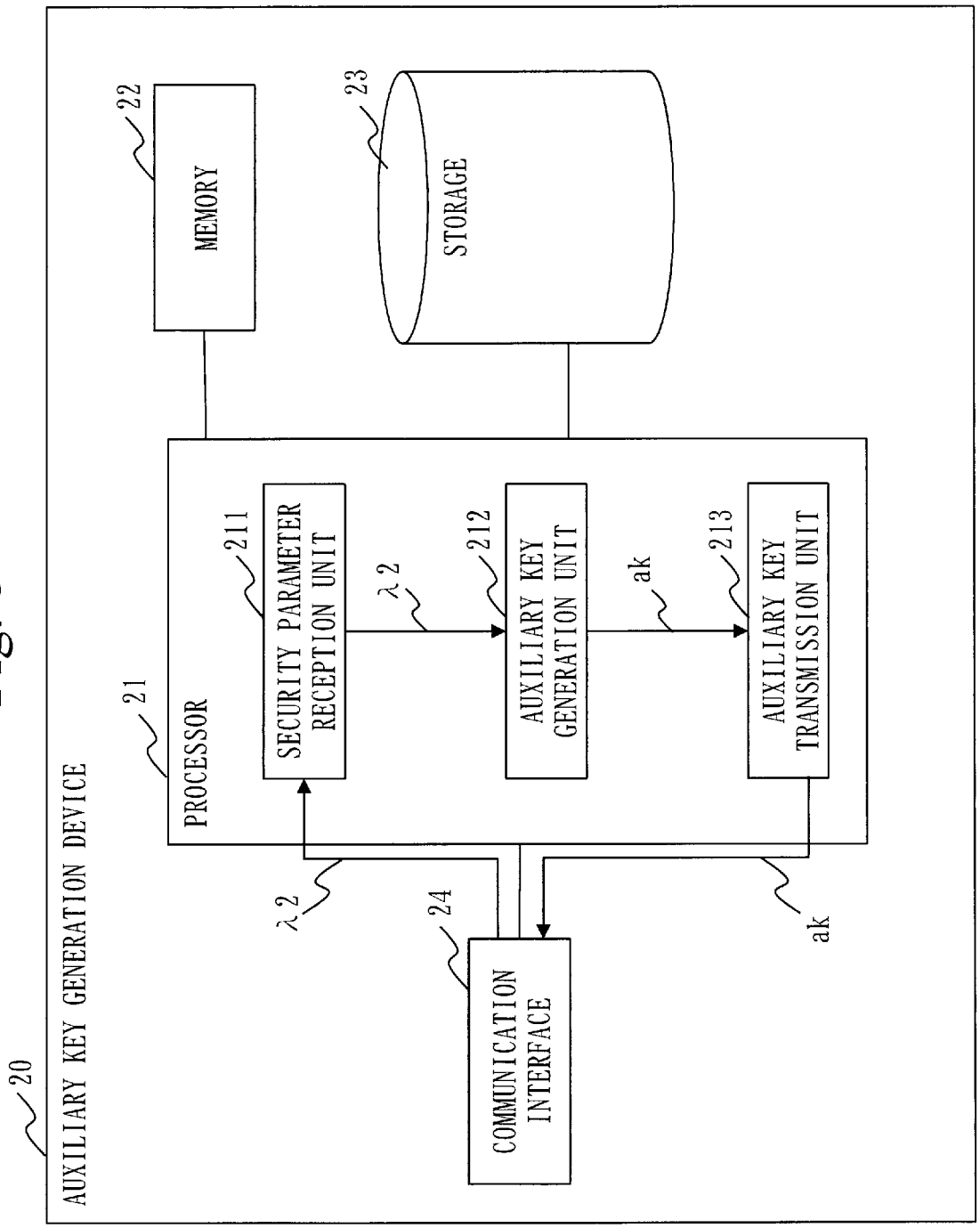
FIG. 3 is a configuration diagram of an auxiliary key generation device 20 according to Embodiment 1.

A configuration of the auxiliary key generation device 20 according to Embodiment 1 will be described referring to FIG. 3.

The auxiliary key generation device 20 is a computer.

The auxiliary key generation device 20 is provided with hardware devices which are a processor 21, a memory 22, a storage 23, and a communication interface 24. The processor 21 is connected to the other hardware devices via signal lines and controls these other hardware devices.

The auxiliary key generation device 20 is provided with a security parameter reception unit 211, an auxiliary key generation unit 212, and an auxiliary key transmission unit 213, as functional configuration elements. Functions of the functional configuration elements of the auxiliary key generation device 20 are implemented by software.

A program that implements the functions of the functional configuration elements of the auxiliary key generation device 20 is stored in the storage 23. This program is read to the memory 22 by the processor 21 and executed by the processor 21. The functions of the functional configuration elements of the auxiliary key generation device 20 are thus implemented.

Figure 4:
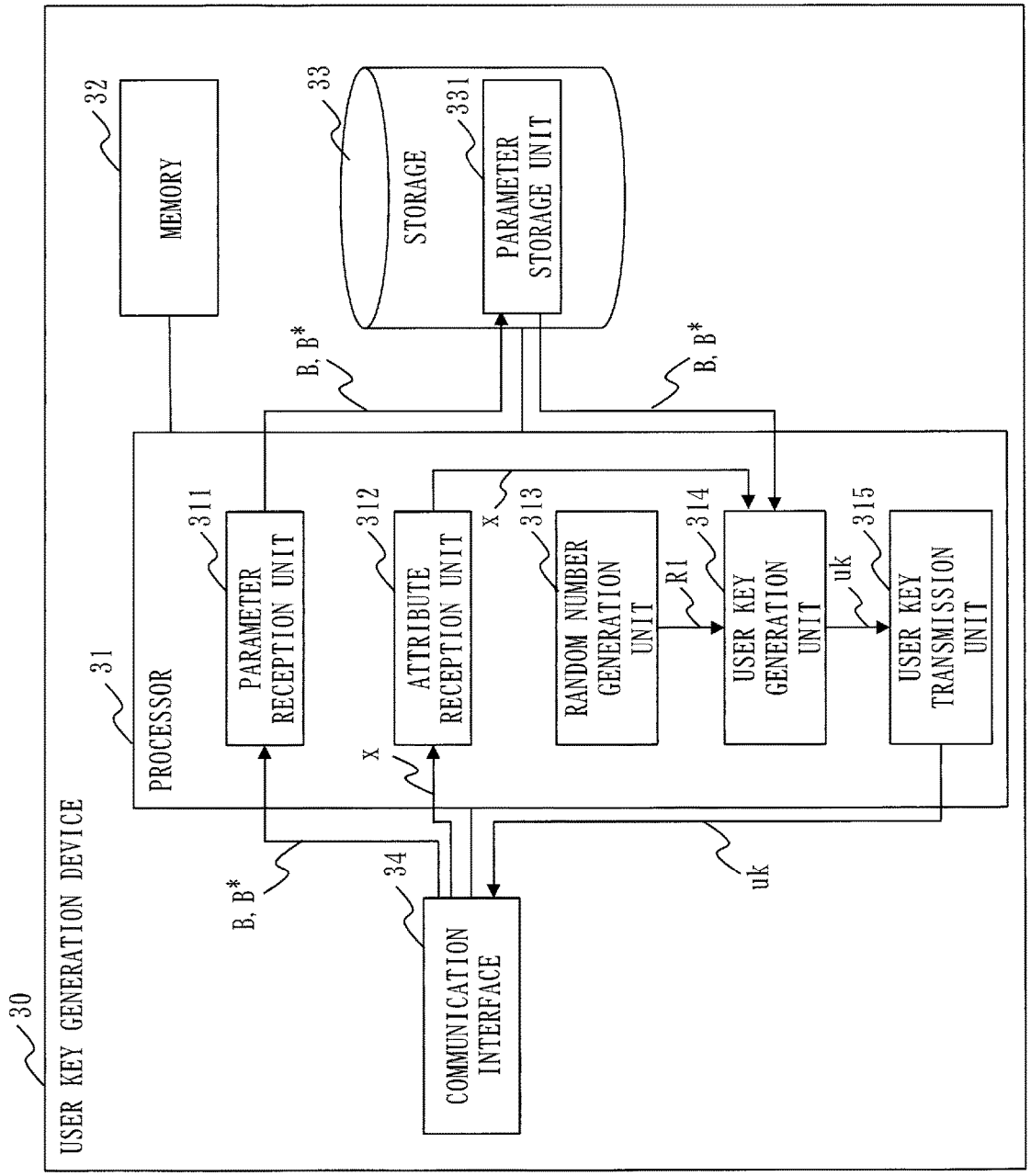
FIG. 4 is a configuration diagram of a user key generation device 30 according to Embodiment 1.

A configuration of the user key generation device 30 according to Embodiment 1 will be described referring to FIG. 4.

The user key generation device 30 is a computer.

The user key generation device 30 is provided with hardware devices which are a processor 31, a memory 32, a storage 33, and a communication interface 34. The processor 31 is connected to the other hardware devices via signal lines and controls these other hardware devices.

The user key generation device 30 is provided with a parameter reception unit 311, an attribute reception unit 312, a random number generation unit 313, a user key generation unit 314, and a user key transmission unit 315, as functional configuration elements. Functions of the functional configuration elements of the user key generation device 30 are implemented by software.

A program that implements the functions of the functional configuration elements of the user key generation device 30 is stored in the storage 33. This program is read to the memory 32 by the processor 31 and executed by the processor 31. The functions of the functional configuration elements of the user key generation device 30 are thus implemented.

Also, the storage 33 implements a function of a parameter storage unit 331.

Figure 5:
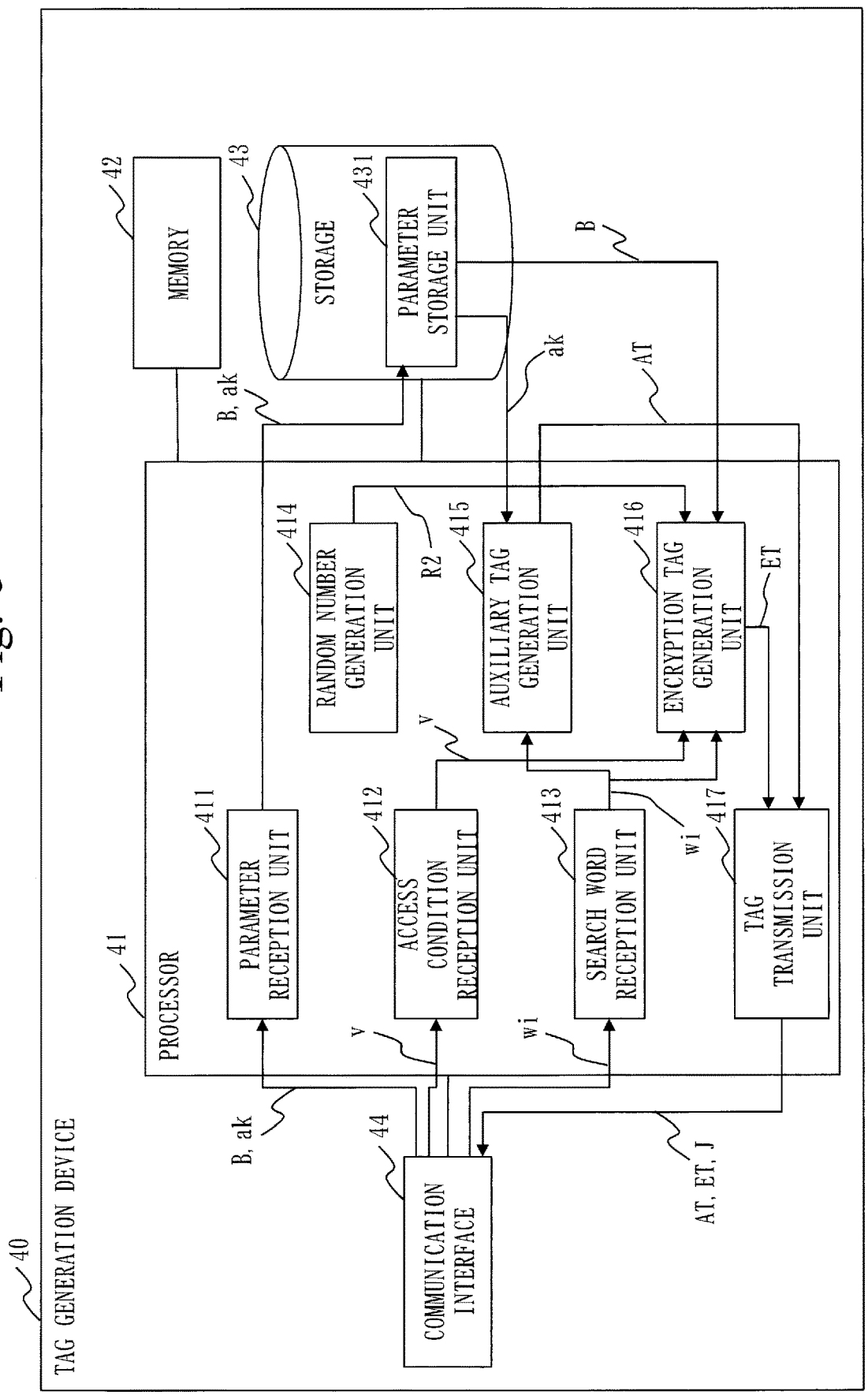
FIG. 5 is a configuration diagram of a tag generation device 40 according to Embodiment 1.

A configuration of the tag generation device 40 according to Embodiment 1 will be described referring to FIG. 5.

The tag generation device 40 is a computer.

The tag generation device 40 is provided with hardware devices which are a processor 41, a memory 42, a storage 43, and a communication interface 44. The processor 41 is connected to the other hardware devices via signal lines and controls these other hardware devices.

The tag generation device 40 is provided with a parameter reception unit 411, an access condition reception unit 412, a search word reception unit 413, a random number generation unit 414, an auxiliary tag generation unit 415, an encryption tag generation unit 416, and a tag transmission unit 417, as functional configuration elements. Functions of the functional configuration elements of the tag generation device 40 are implemented by software.

A program that implements the functions of the functional configuration elements of the tag generation device 40 is stored in the storage 43. This program is read to the memory 42 by the processor 41 and executed by the processor 41. The functions of the functional configuration elements of the tag generation device 40 are thus implemented.

The storage 43 implements a function of a parameter storage unit 431.

Figure 6:
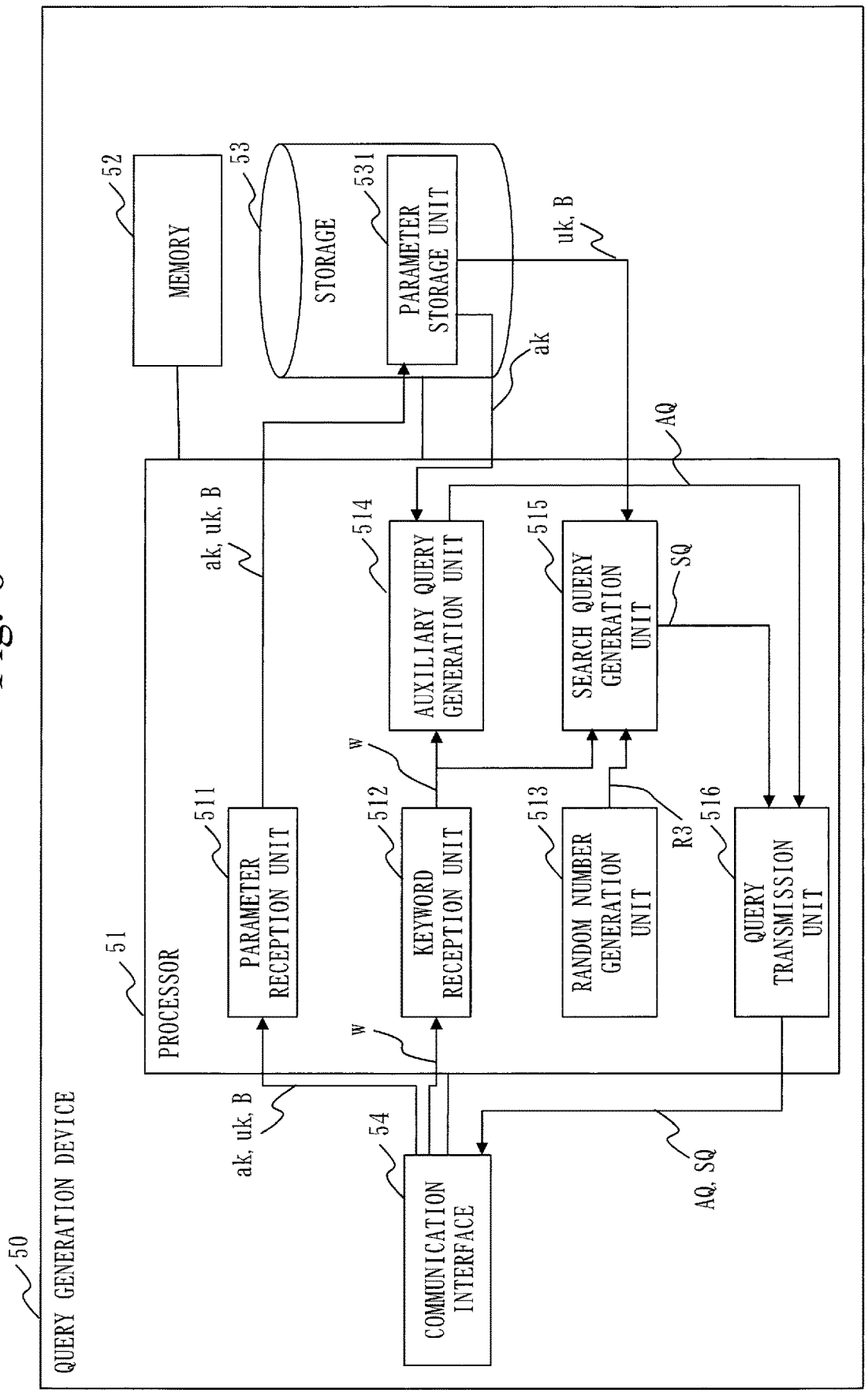
FIG. 6 is a configuration diagram of a query generation device 50 according to Embodiment 1.

A configuration of the query generation device 50 according to Embodiment 1 will be described referring to FIG. 6.

The query generation device 50 is a computer.

The query generation device 50 is provided with hardware devices which are a processor 51, a memory 52, a storage 53, and a communication interface 54. The processor 51 is connected to the other hardware devices via signal lines and controls these other hardware devices.

The query generation device 50 is provided with a parameter reception unit 511, a keyword reception unit 512, a random number generation unit 513, an auxiliary query generation unit 514, a search query generation unit 515, and query transmission unit 516, as functional configuration elements. Functions of the functional configuration elements of the query generation device 50 are implemented by software.

A program that implements the functions of the functional configuration elements of the query generation device 50 is stored in the storage 53. This program is read to the memory 52 by the processor 51 and executed by the processor 51. The functions of the functional configuration elements of the query generation device 50 are thus implemented.

The storage 53 implements a function of a parameter storage unit 531.

Figure 7:
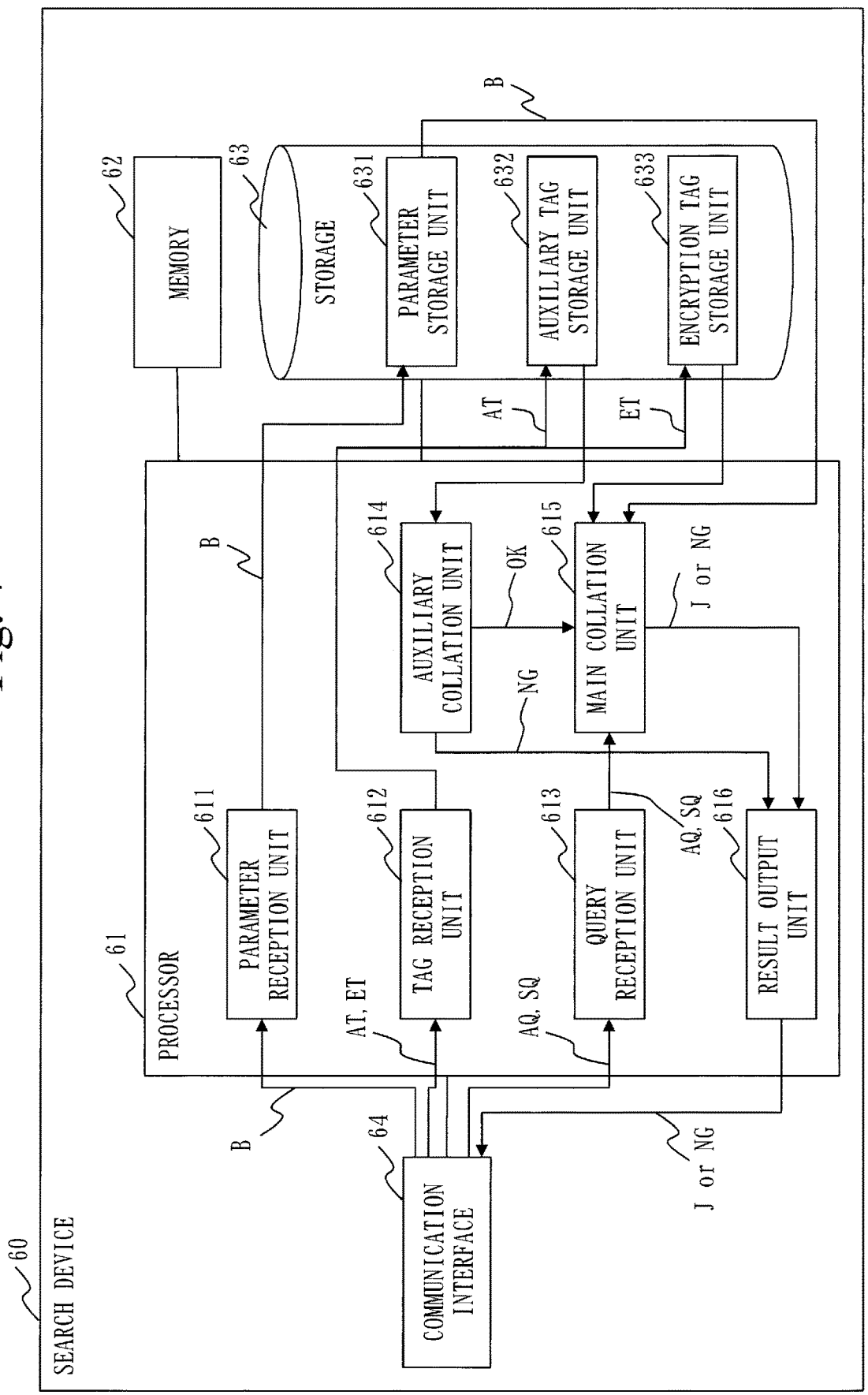
FIG. 7 is a configuration diagram of a search device 60 according to Embodiment 1.

A configuration of the search device 60 will be described referring to FIG. 7.

The search device 60 is a computer.

The search device 60 is provided with hardware devices which are a processor 61, a memory 62, a storage 63, and a communication interface 64. The processor 61 is connected to the other hardware devices via signal lines and controls these other hardware devices.

The search device 60 is provided with a parameter reception unit 611, a tag reception unit 612, a query reception unit 613, an auxiliary collation unit 614, a main collation unit 615, and a result output unit 616, as functional configuration elements. Functions of the functional configuration elements of the search device 60 are implemented by software.

A program that implements the functions of the functional configuration elements of the search device 60 is stored in the storage 63. This program is read to the memory 62 by the processor 61 and executed by the processor 61. The functions of the functional configuration elements of the search device 60 are thus implemented.

The storage 63 implements a function of a parameter storage unit 631, a function of an auxiliary tag storage unit 632, and a function of an encryption tag storage unit 633.

*Description of Operation*

An operation of the searchable encryption system 1 according to Embodiment 1 will be described referring to FIGS. 8 to 13.

An operation of the tag generation device 40 according to Embodiment 1 corresponds to a tag generation method according to Embodiment 1. The operation of the tag generation device 40 according to Embodiment 1 also corresponds to processing of a tag generation program according to Embodiment 1.

An operation of the query generation device 50 according to Embodiment 1 corresponds to a query generation method according to Embodiment 1. The operation of the query generation device 50 according to Embodiment 1 corresponds to processing of a query generation program according to Embodiment 1.

An operation of the search device 60 according to Embodiment 1 corresponds to a search method according to Embodiment 1. The operation of the search device 60 according to Embodiment 1 also corresponds to processing of a search program according to Embodiment 1.

In Embodiment 1, a case will be described where a system described in Patent Literature 1 is used as an access controllable searchable encryption system. Another system may be used as the access controllable searchable encryption system. When another system is used, a description on the system of Patent Literature 1 in the following explanation may be modified appropriately in accordance with the employed system.

Figure 8:
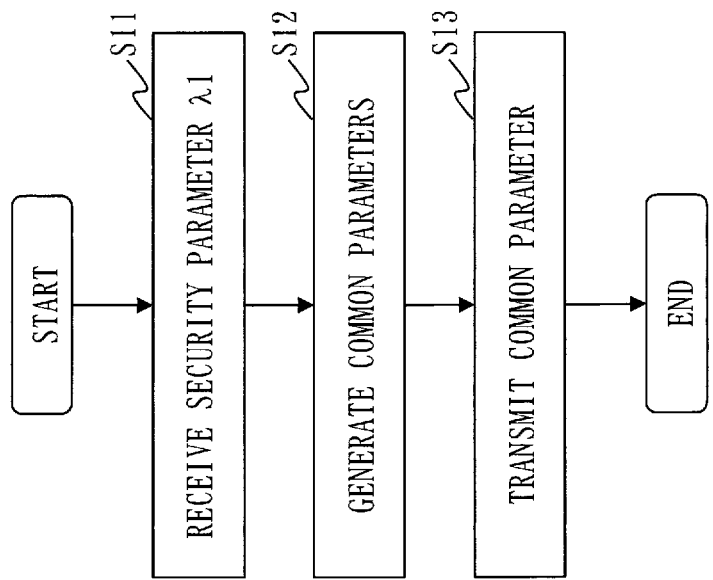
FIG. 8 is a flowchart of common parameter generation processing according to Embodiment 1.

Common parameter generation processing according to Embodiment 1 will be described referring to FIG. 8.

(Step S11: Security Parameter Reception Process)

The security parameter reception unit 111 of the common parameter generation device 10 receives a security parameter $\lambda 1$ as input.

The security parameter $\lambda 1$ is information for determining a number of bits of a user key uk used in the searchable encryption system 1. The security parameter $\lambda 1$ is inputted by an administrator or the like of the common parameter generation device 10.

(Step S12: Parameter Generation Process)

Based on the security parameter $1l$ received in step S11, the parameter generation unit 112 of the common parameter generation device 10 generates common parameters in the access controllable searchable encryption system.

In Embodiment 1, the parameter generation unit 112 executes processing of initial setting of the system described in Patent Literature 1 to generate a master key containing a basis $B^*=(b^*_1, b^*_2, \ldots, b^*_N)$ and a public parameter containing a basis $B=(b_1, b_2, \ldots, b_N)$. The parameter generation unit 112 treats the master key and the public parameter as the common parameters.

(Step S13: Parameter Transmission Process)

The parameter transmission unit 113 of the common parameter generation device 10 transmits the common parameters generated in step S12 to other devices via the transmission line 70.

In Embodiment 1, the parameter transmission unit 113 transmits the master key to the user key generation device 30 in secrecy. To transmit in secrecy means, for example, to encrypt data by an existing cryptosystem and to transmit the encrypted data. The parameter transmission unit 113 transmits the public parameter to the user key generation device 30, the tag generation device 40, the query generation device 50, and the search device 60.

The parameter reception unit 311 of the user key generation device 30 receives the transmitted master key and the transmitted public parameter. The parameter reception unit 311 then writes the master key and the public parameter to the parameter storage unit 331. The parameter reception unit 411 of the tag generation device 40 receives the transmitted public parameter. The parameter reception unit 411 then writes the public parameter to the parameter storage unit 431. The parameter reception unit 511 of the query generation device 50 receives the transmitted public parameter. The parameter reception unit 511 then writes the public parameter to the parameter storage unit 531. The parameter reception unit 611 of the search device 60 receives the transmitted public parameter. The parameter reception unit 611 then writes the public parameter to the parameter storage unit 631.

Where the searchable encryption system 1 is provided with a plurality of user key generation devices 30, in step S13, the parameter generation unit 112 executes processing of intermediate private key generation described in Patent Literature 1 for each user key generation device 30. The parameter generation unit 112 thus generates an intermediate private key for each user key generation device 30. Then, in step S13, the parameter transmission unit 113 transmits the intermediate private key, in place of the master key, to the corresponding user key generation device 30.

Figure 9:
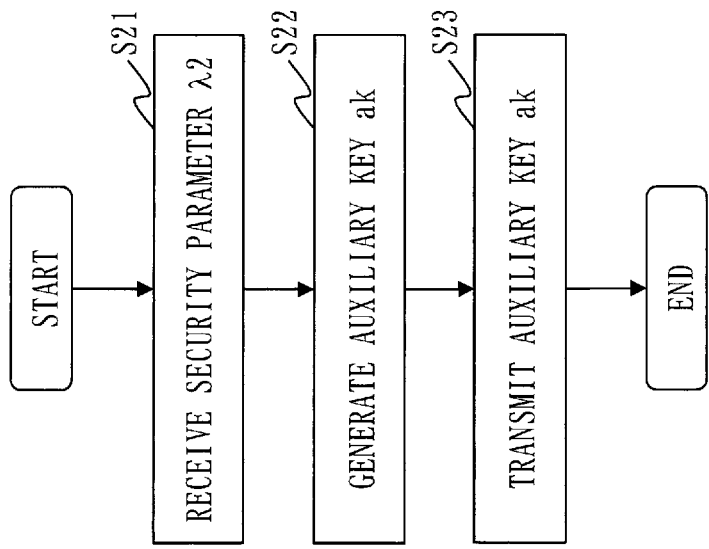
FIG. 9 is a flowchart of auxiliary key generation processing according to Embodiment 1.

Auxiliary key generation processing according to Embodiment 1 will be described referring to FIG. 9.

(Step S21: Security Parameter Reception Process)

The security parameter reception unit 211 of the auxiliary key generation device 20 receives a security parameter $\lambda 2$ as input.

The security parameter $\lambda 2$ is information for determining a number of bits of an auxiliary key ak used in the searchable encryption system 1. The security parameter $\lambda 2$ is inputted by an administrator or the like of the auxiliary key generation device 20.

(Step S22: Key Generation Process)

Based on the security parameter $\lambda 2$ received in step S21, the auxiliary key generation unit 212 of the auxiliary key generation device 20 generates the auxiliary key ak being a key of a common key cryptosystem or a hash function. In the following description, the common key cryptosystem or the hash function will be referred to as a target system. The common key cryptosystem includes a block cipher, a stream cipher, and so on. For example, the auxiliary key ak is a random bit string having a number of bits indicated by the security parameter $\lambda 2$.

(Step S23: Auxiliary Key Transmission Process)

The auxiliary key transmission unit 213 of the auxiliary key generation device 20 transmits the auxiliary key ak generated in step S22 to other devices via the transmission line 70.

In Embodiment 1, the auxiliary key transmission unit 213 transmits the auxiliary key ak to the tag generation device 40 and the query generation device 50 in secrecy.

The parameter reception unit 411 of the tag generation device 40 receives the transmitted auxiliary key ak. The parameter reception unit 411 then writes the auxiliary key ak to the parameter storage unit 431. The parameter reception unit 511 of the query generation device 50 receives the transmitted auxiliary key ak. The parameter reception unit 511 then writes the auxiliary key ak to the parameter storage unit 531.

Figure 10:
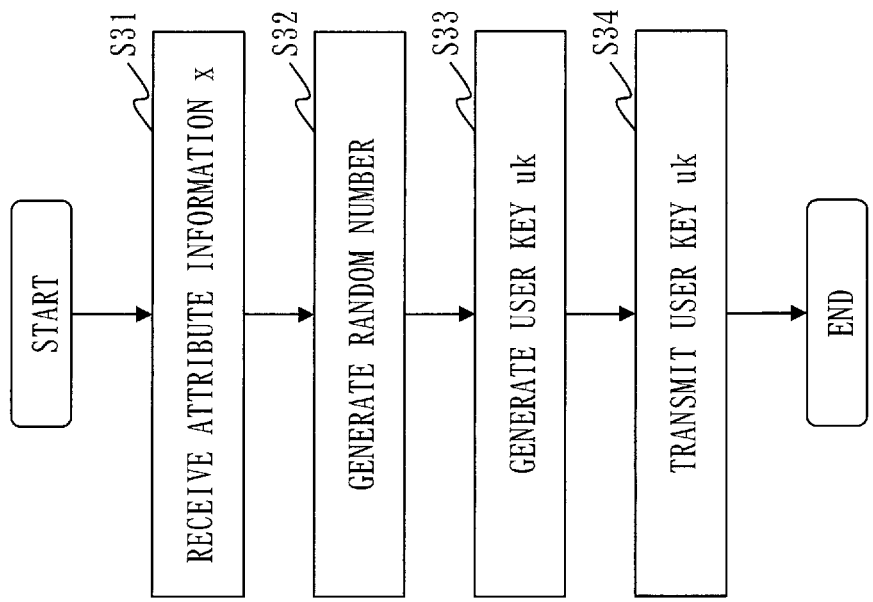
FIG. 10 is a flowchart of user key generation processing according to Embodiment 1.

User key generation processing according to Embodiment 1 will be described referring to FIG. 10.

(Step S31: Attribute Reception Process)

The attribute reception unit 312 of the user key generation device 30 receives attribute information x indicating an attribute of the user, as input. The attribute of the user is, for example, the company and department the user belongs to, the post, and so on.

(Step S32: Random Number Generation Process)

The random number generation unit 313 of the user key generation device 30 generates a random number R1 that is necessary for the user key uk.

(Step S33: Key Generation Process)

The user key generation unit 314 of the user key generation device 30 generates the user key uk being set with the attribute information x, using the attribute information x received in step S31, the random number R1 generated in step S32, and the common parameters stored in the parameter storage unit 331.

In Embodiment 1, the user key generation unit 314 executes user private key generation processing described in Patent Literature 1 to generate a user private key. The user key generation unit 314 treats the user private key as the user key uk. That is, the user key generation unit 314 generates the user key uk by setting the attribute information x and the random number R1 as coefficients of the basis vector of the basis B* contained in the master key or intermediate private key.

(Step S34: User Key Transmission Process)

The user key transmission unit 315 of the user key generation device 30 transmits the user key uk generated in step S33 to the corresponding query generation device 50 via the transmission line 70 in secrecy. The corresponding query generation device 50 means a query generation device 50 that is used by the user indicated by the attribute information x received in step S31.

Figure 11:
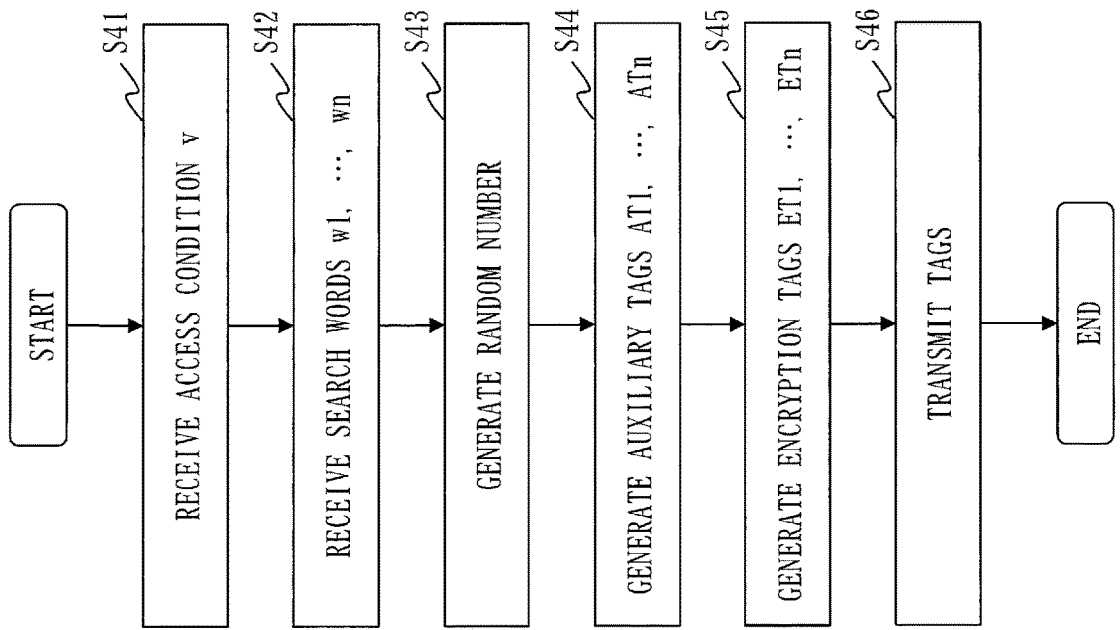
FIG. 11 is a flowchart of tag generation processing according to Embodiment 1.

Tag generation processing according to Embodiment 1 will be described referring to FIG. 11.

(Step S41: Access Condition Reception Process)

The access condition reception unit 412 of the tag generation device 40 receives an access condition v indicating an accessible attribute, as input. The access condition v represents a set of attributes that can be accessed, using, for example, a logical expression. Attributes that can be accessed means access-permitted attributes.

(Step S42: Search Word Reception Process)

The search word reception unit 413 of the tag generation device 40 receives n of search words w1, . . . , wn as input where n is an integer of 1 or more. The search word is a character string of 1 or more characters.

(Step S43: Random Number Generation Process)

The random number generation unit 414 of the tag generation device 40 generates a random number R2 that is necessary for an encryption tag ET.

(Step S44: Auxiliary Tag Generation Process)

The auxiliary tag generation unit 415 of the tag generation device 40 randomly changes the order of the search words w1, . . . , wn received in step S42. The order-changed search words are noted as w'1, . . . , w'n.

The auxiliary tag generation unit 415 then generates auxiliary tags AT1, . . . , ATn corresponding to the search words w'1, . . . , w'n. More specifically, the auxiliary tag generation unit 415 inputs a search word w'i about each integer i of i=1, . . . , n and the auxiliary key ak to the target system that is a common key cryptosystem or a hash function, and converts the search word w'i, thereby generating an auxiliary tag ATi.

According to a specific example, the auxiliary tag generation unit 415 uses a hash function H as the target system. The auxiliary tag generation unit 415 calculates ATi=H(ak, w'i) for each integer i of i=1, . . . , n.

(Step S45: Encryption Tag Generation Process)

The encryption tag generation unit 416 of the tag generation device 40 generates encryption tags ET1, . . . , ETn corresponding to the search words w1, . . . , wn received in step S42. More specifically, the encryption tag generation unit 416 generates an encryption tag ETi by setting the access condition v received in step S41, a search word wi about each integer i of i=1, . . . , n, and the random number R2 generated in step S43.

In Embodiment 1, for each integer i of i=1, . . . , n, the encryption tag generation unit 416 inputs the access condition v, the search word wi, and the random number R2, thereby generating a tag-cum-encryption data encryption key tag described in Patent Literature 1. Then, the encryption tag generation unit 416 treats the tag-cum-encryption data encryption key tag as the encryption tag ETi.

(Step S46: Tag Transmission Process)

The tag transmission unit 417 of the tag generation device 40 transmits the auxiliary tags AT1, . . . , ATn generated in step S44, the encryption tags ET1, ..., ETn generated in step S45, and indices j (for example, indices 1, ..., n) being indicators of the encryption tag ET1, ..., ETn, respectively, to the search device 60 as a tag for search.

The tag reception unit 612 of the search device 60 receives the transmitted auxiliary tags AT1, ..., ATn, the transmitted encryption tags ET1, ..., ETn, and the transmitted indices j. The tag reception unit 612 then writes the auxiliary tags AT1, ..., ATn to the auxiliary tag storage unit 632. The tag reception unit 612 also writes the encryption tags ET1, ..., ETn and the indices j to the encryption tag storage unit 633 such that the encryption tags ET1, ..., ETn and the indices j are tagged with each other.

Figure 12:
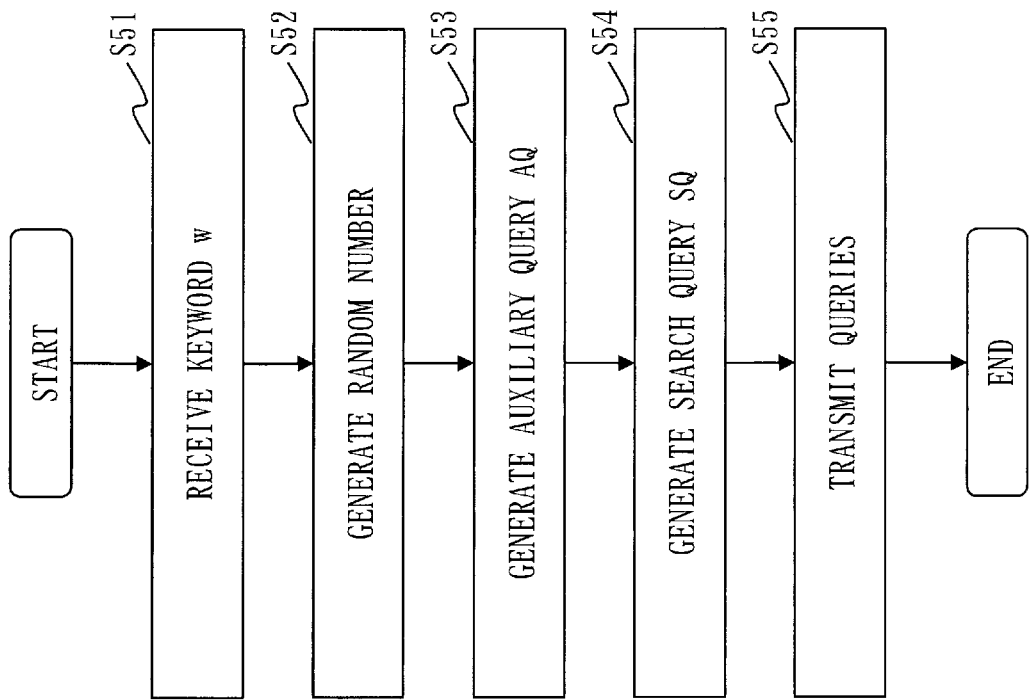
FIG. 12 is a flowchart of query generation processing according to Embodiment 1.

Query generation processing according to Embodiment 1 will be described referring to FIG. 12.

(Step S51: Keyword Reception Process)

The keyword reception unit 512 of the query generation device 50 receives a keyword w with which search is performed, as input. The keyword w is a character string of one or more characters.

(Step S52: Random Number Generation Process)

The random number generation unit 513 of the query generation device 50 generates a random number R3 that is necessary for a search query SQ.

(Step S53: Auxiliary Query Generation Process)

The auxiliary query generation unit 514 of the query generation device 50 generates an auxiliary query AQ corresponding to the keyword w received in step S51. More specifically, the auxiliary query generation unit 514 inputs the keyword w and the auxiliary key ak to the target system being a common key cryptosystem or a hash function, and converts the keyword w, thereby generating the auxiliary query AQ.

At this point, the auxiliary query generation unit 514 generates the auxiliary query AQ using the same function as that of the target system employed in step S44. According to a specific example, the auxiliary query generation unit 514 uses the hash function H as the target system. The auxiliary query generation unit 514 then calculates $AQ=H(ak, w)$.

(Step S54: Search Query Generating Process)

The search query generation unit 515 of the query generation device 50 generates the search query SQ corresponding to the keyword w received in step S51. More specifically, the search query generation unit 515 generates the search query SQ by setting the access condition v being attribute information indicating the attributes of the user, the keyword w, and the random number R3.

In Embodiment 1, the search query generation unit 515, taking the keyword w and the user key uk as input, generates a trapdoor described in Patent Literature 1. The search query generation unit 515 treats the trapdoor as the search query SQ.

(Step S55: Query Transmission Process)

The query transmission unit 516 of the query generation device 50 transmits the auxiliary query AQ generated in step S53 and the search query SQ generated in step S54 to the search device 60 as a query for search.

Figure 13:
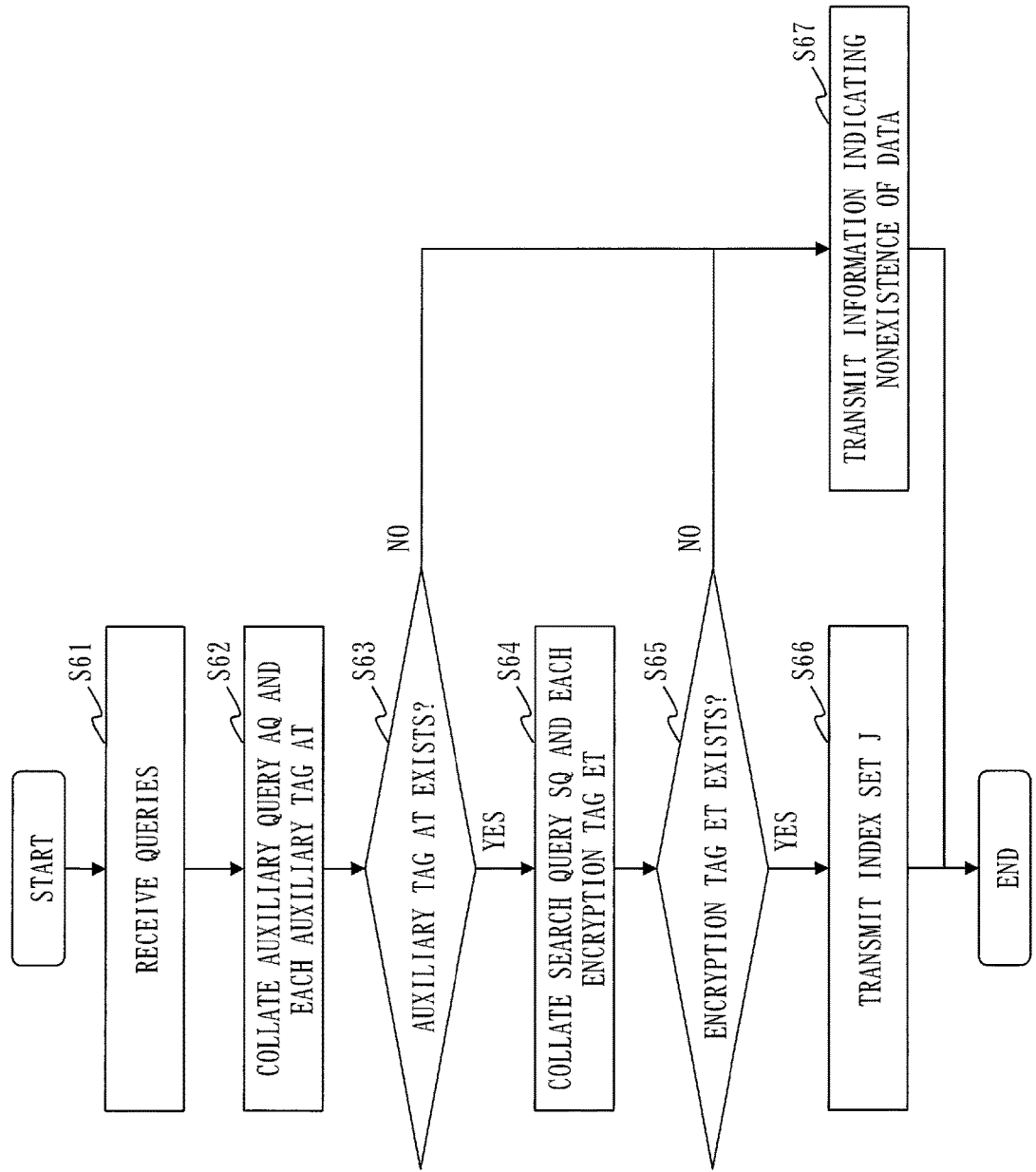
FIG. 13 is a flowchart of search processing according to Embodiment 1.

Search processing according to Embodiment 1 will be described referring to FIG. 13.

(Step S61: Query Reception Process)

The query reception unit 613 of the search device 60 receives the auxiliary query AQ and the search query SQ which are transmitted in step S55.

(Step S62: Auxiliary Collation Process)

The auxiliary collation unit 614 of the search device 60 collates the auxiliary query AQ received in step S61 and each auxiliary tag AT stored in the auxiliary tag storage unit 632 with each other.

More specifically, the auxiliary collation unit 614 collates the auxiliary query AQ and each auxiliary tag AT with each other by determining whether or not the auxiliary query AQ and each auxiliary tag AT correspond to each other. The auxiliary collation unit 614 counts a correspondence number m of the auxiliary tags AT corresponding to the auxiliary queries AQ. To correspond means to coincide, for example, although the meaning differs according to the target system.

(Step S63: Auxiliary Determination Process)

The auxiliary collation unit 614 of the search device 60 determines whether or not an auxiliary tag AT corresponding to the auxiliary query AQ exists. More specifically, the auxiliary collation unit 614 determines whether or not the correspondence number m counted in step S62 is 1 or more.

If an auxiliary tag AT corresponding to the auxiliary query AQ exists, the auxiliary collation unit 614 advances the processing to step S64. If an auxiliary tag AT corresponding to the auxiliary query AQ does not exist, the auxiliary collation unit 614 advances the processing to step S67.

(Step S64: Main Collation Process)

The main collation unit 615 of the search device 60 collates the search query SQ received in step S61 and each encryption tag ET stored in the encryption tag storage unit 633.

More specifically, the main collation unit 615 collates the search query SQ with each encryption tag ET by performing pairing operation of the search query SQ and each encryption tag ET, in the same manner as in comparing processing, described in Patent Literature 1, between a tag-cum-encryption data encryption key tag and a trapdoor. That is, the main collation unit 615 calculates $V=e(SQ, ET)$. If $V=1$, the main collation unit 615 determines that the search query SQ and the encryption tag ET correspond to each other. If $V \neq 1$, the main collation unit 615 determines that the search query SQ and the encryption tag ET do not correspond to each other.

When the number of encryption tags ET determined as corresponding reaches the correspondence number m, the main collation unit 615 ends the process of step S64 and advances the processing to step S65.

(Step S65: Main Determination Process)

The main collation unit 615 of the search device 60 determines whether or not an encryption tag ET corresponding to the search query SQ exists.

If an encryption tag ET corresponding to the search query SQ exists, the main collation unit 615 advances the processing to step S66. If an encryption tag ET corresponding to the search query SQ does not exist, the main collation unit 615 advances the processing to step S67.

(Step S66: First Output Process)

The result output unit 616 of the search device 60 outputs a set J of indices j tagged with the encryption tag ET which is determined as corresponding to the search query SQ in step S64. For example, the result output unit 616 transmits the set J to the query generation device 50 which is the sender of the queries for search, via the transmission line 70.

(Step S67: Second Outputting Process)

The result output unit 616 of the search device 60 outputs information indicating nonexistence of data to be searched for by using the keyword w. For example, the result output unit 616 transmits information indicating nonexistence of data to be searched for by using the keyword w, to the query generation device 50 which is the sender of the queries for search, via the transmission line 70.

Effect of Embodiment 1

As described above, in the searchable encryption system 1 according to Embodiment 1, when an auxiliary tag AT corresponding to the auxiliary query AQ exists, an encryption tag ET corresponding to the search query SQ is specified. The processing of specifying an encryption tag ET corresponding to the search query SQ takes a long processing time, since cryptographic access control is performed. When there is no data to be searched for by using the keyword w, the processing time can be shortened, since time-consuming processing need not be executed.

In the searchable encryption system 1 according to Embodiment 1, the correspondence number m of the auxiliary tags AT corresponding to the auxiliary query AQ is counted in advance. In the searchable encryption system 1, when the number of encryption tags ET determined as corresponding reaches the correspondence number m, the processing of specifying the encryption tag ET corresponding to the search query SQ is ended. This can reduce the number of times the time-consuming processing is executed, so that the processing time can be shortened.

In the searchable encryption system 1 according to Embodiment 1, data to be searched for by using the keyword w is specified by executing the processing of specifying the encryption tag ET corresponding to the search query SQ. Therefore, cryptographic flexible access control can be performed.

In the searchable encryption system 1 according to Embodiment 1, when generating the auxiliary tag AT, the order of the search words is changed randomly. Therefore, the search device 60 cannot specify the corresponding relation between the auxiliary tag AT and the encryption tag ET. This can prevent leaking of information on the search words.

*Other Configurations*

<Modification 1>

In Embodiment 1, a case has been described where a system described in Patent Literature 1 is used as an access controllable searchable encryption system. The access controllable searchable encryption system is not limited to the system described in Patent Literature 1, but another system may be used.

Even in a case where another system is used, a key technique of specifying an encryption tag ET corresponding to the search query SQ, when an auxiliary tag AT corresponding to an auxiliary query AQ exists, can be employed. An effect can be obtained by this key technique.

<Modification 2>

In Embodiment 1, the functional configuration elements of each of the common parameter generation device 10, the auxiliary key generation device 20, the user key generation device 30, the tag generation device 40, the query generation device 50, and the search device 60 are implemented by software. According to Modification 2, the functional configuration elements may be implemented by hardware. Modification 2 will be described regarding a difference from Embodiment 1.

Figure 14:
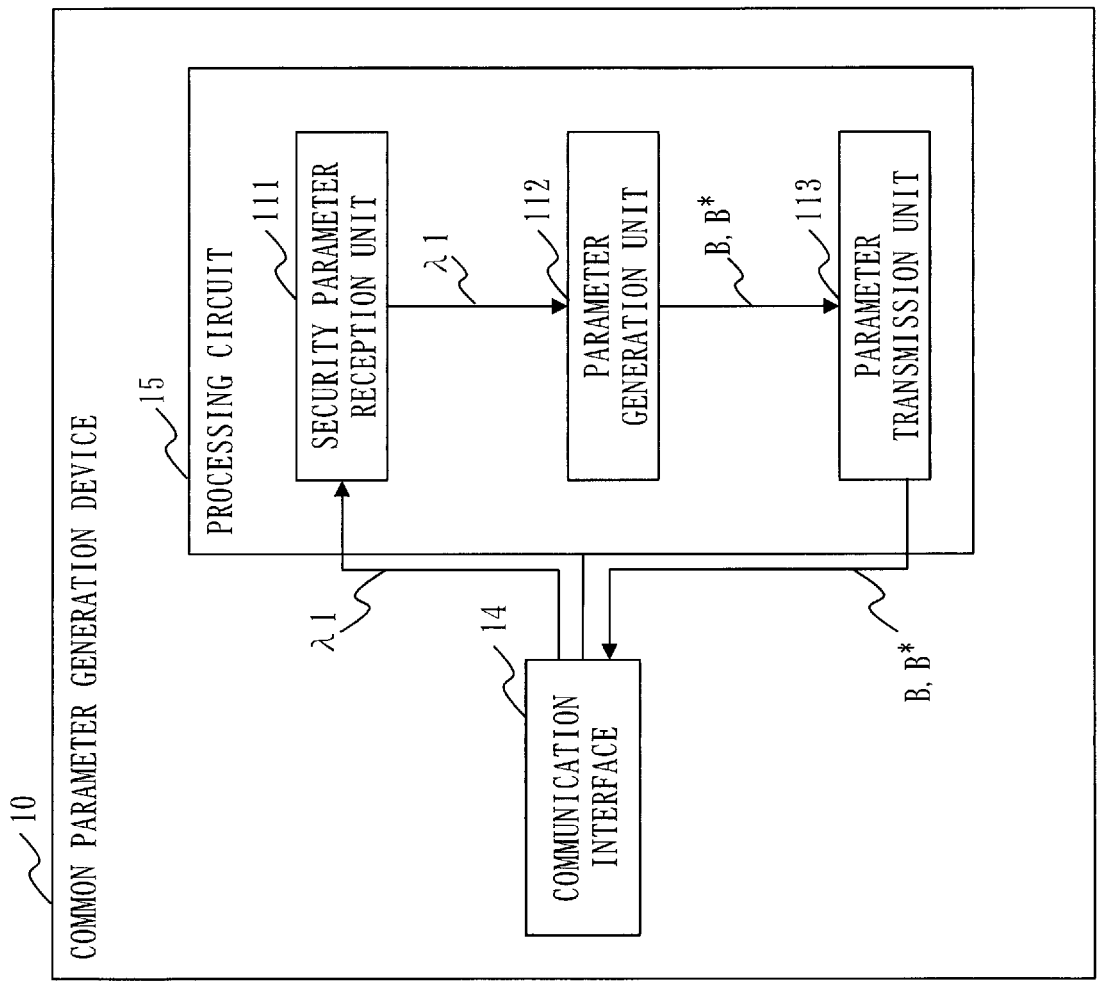
FIG. 14 is a configuration diagram of a common parameter generation device 10 according to Modification 2.

A configuration of a common parameter generation device 10 according to Modification 2 will be described referring to FIG. 14.

When functions are implemented by hardware, the common parameter generation device 10 is provided with a processing circuit 15 in place of the processor 11, memory 12, and storage 13. The processing circuit 15 is a dedicated electronic circuit that implements the functional configuration elements of the common parameter generation device 10 and the functions of the memory 12 and storage 13.

Figure 15:
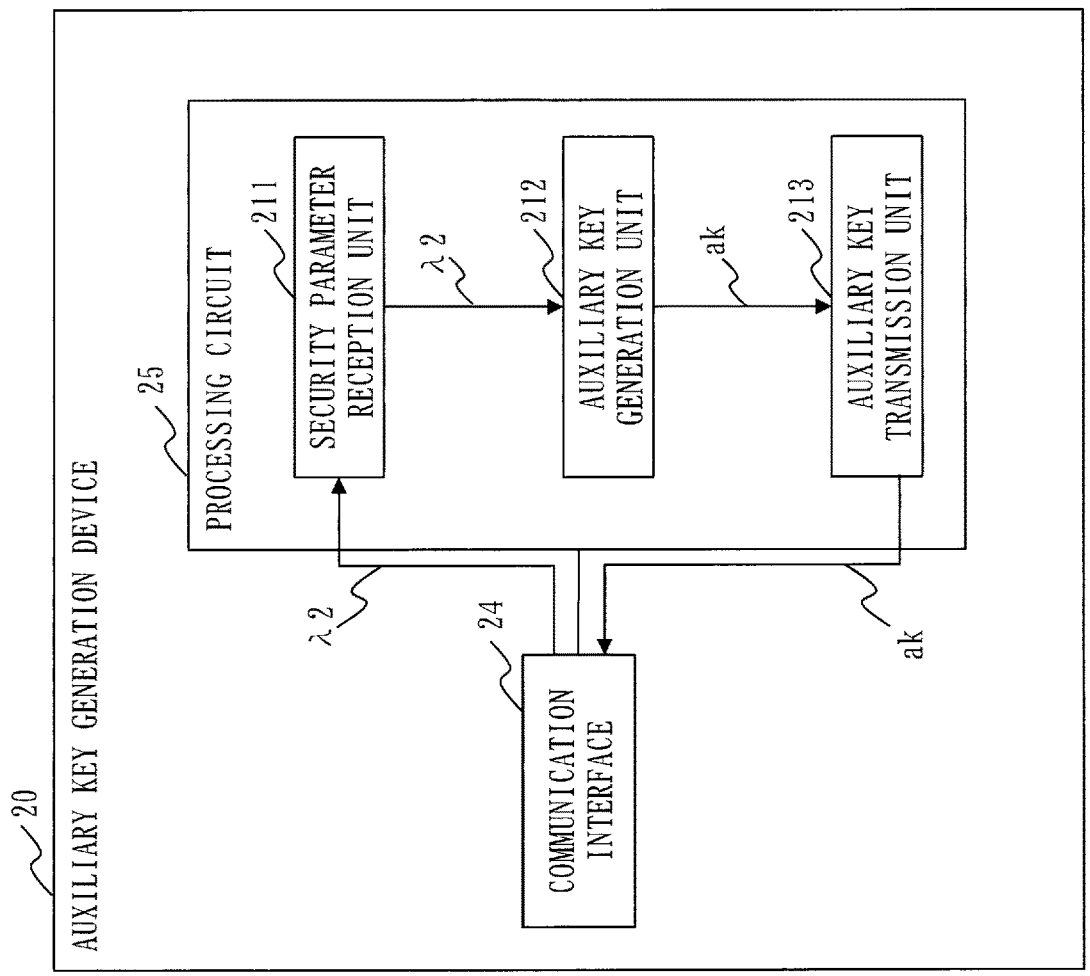
FIG. 15 is a configuration diagram of an auxiliary key generation device 20 according to Modification 2.

A configuration of an auxiliary key generation device 20 according to Modification 2 will be described referring to FIG. 15.

When functions are implemented by hardware, the auxiliary key generation device 20 is provided with a processing circuit 25 in place of the processor 21, memory 22, and storage 23. The processing circuit 25 is a dedicated electronic circuit that implements the functional configuration elements of the auxiliary key generation device 20 and the functions of the memory 22 and storage 23.

Figure 16:
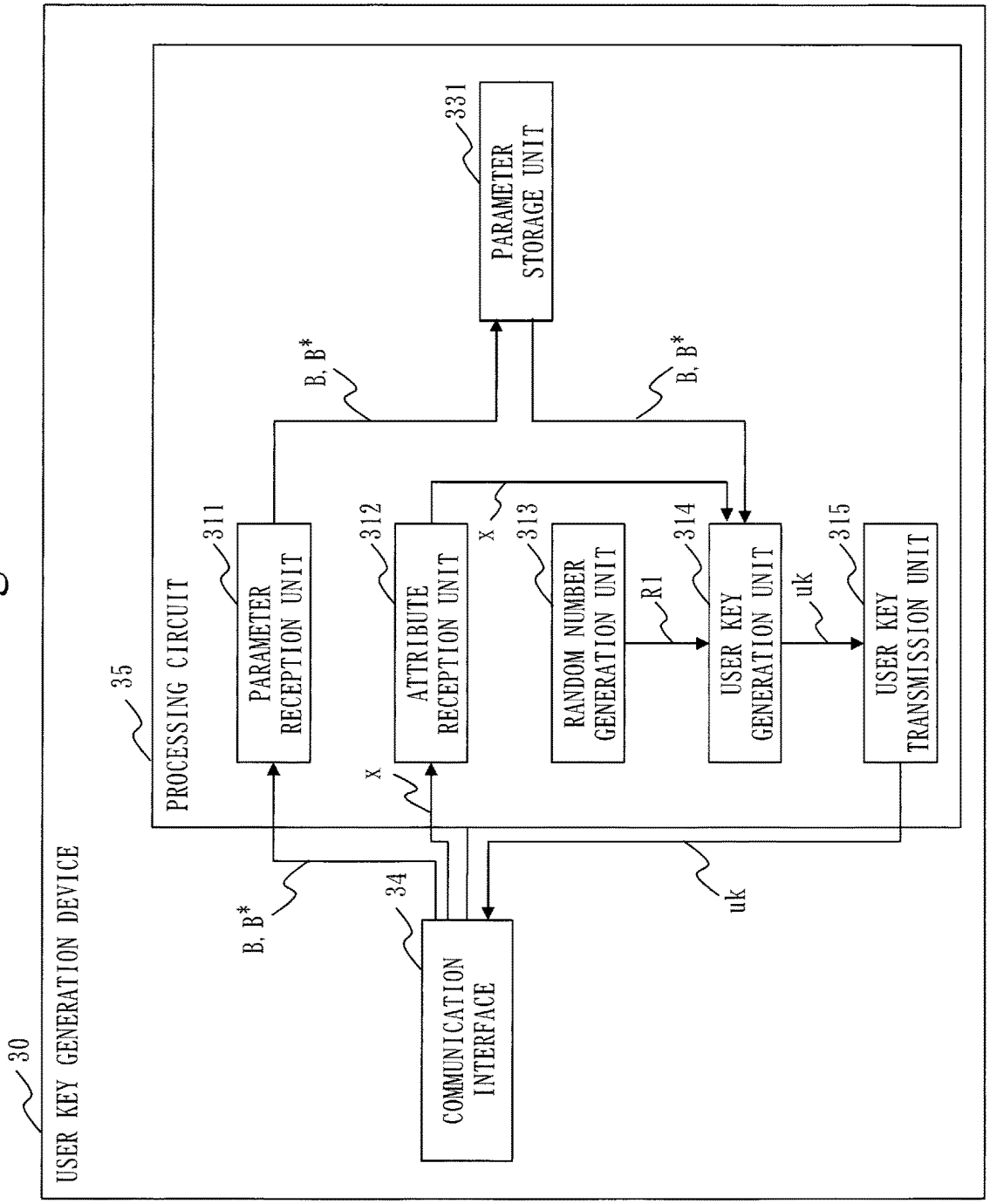
FIG. 16 is a configuration diagram of a user key generation device 30 according to Modification 2.

A configuration of a user key generation device 30 according to Modification 2 will be described referring to FIG. 16.

When functions are implemented by hardware, the user key generation device 30 is provided with a processing circuit 35 in place of the processor 31, memory 32, and storage 33. The processing circuit 35 is a dedicated electronic circuit that implements the functional configuration elements of the user key generation device 30 and the functions of the memory 32 and storage 33.

Figure 17:
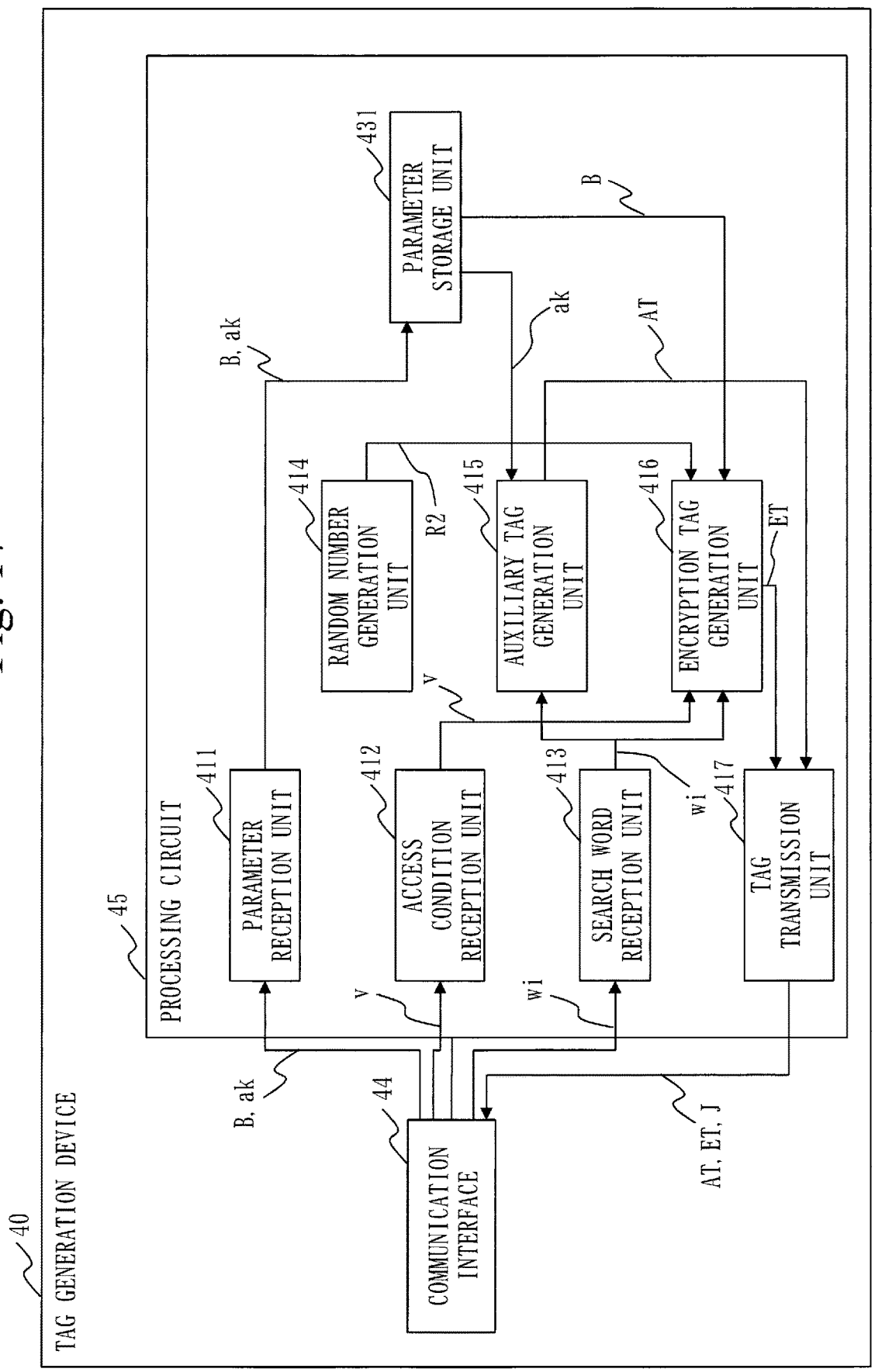
FIG. 17 is a configuration diagram of a tag generation device 40 according to Modification 2.

A configuration of a tag generation device 40 according to Modification 2 will be described referring to FIG. 17.

When functions are implemented by hardware, the tag generation device 40 is provided with a processing circuit 45 in place of the processor 41, memory 42, and storage 43. The processing circuit 45 is a dedicated electronic circuit that implements the functional configuration elements of the tag generation device 40 and the functions of the memory 42 and storage 43.

Figure 18:
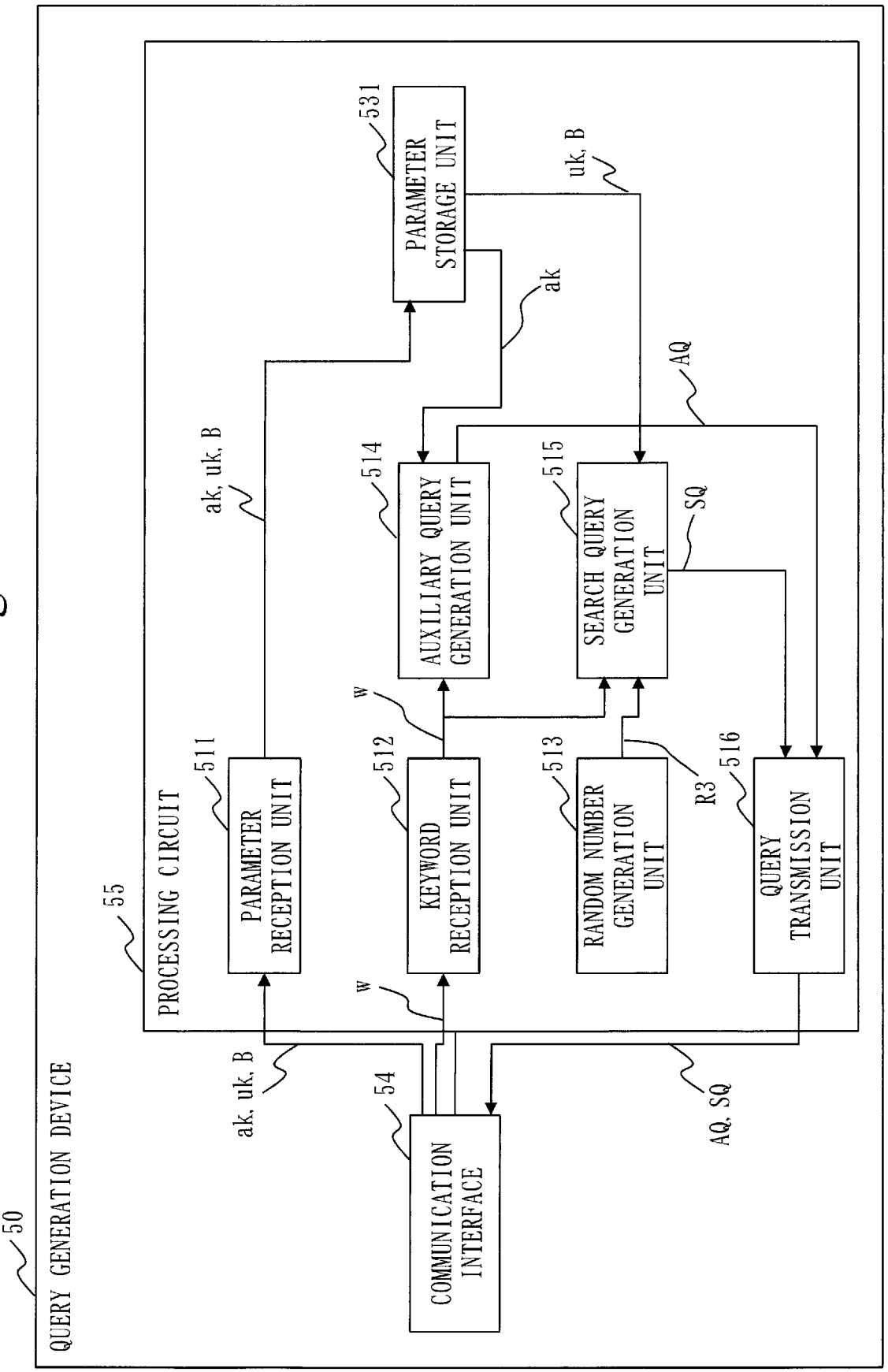
FIG. 18 is a configuration diagram of a query generation device 50 according to Modification 2.

A configuration of a query generation device 50 according to Modification 2 will be described referring to FIG. 18.

When functions are implemented by hardware, the query generation device 50 is provided with a processing circuit 55 in place of the processor 51, memory 52, and storage 53. The processing circuit 55 is a dedicated electronic circuit that implements the functional configuration elements of the query generation device 50 and the functions of the memory 52 and storage 53.

Figure 19:
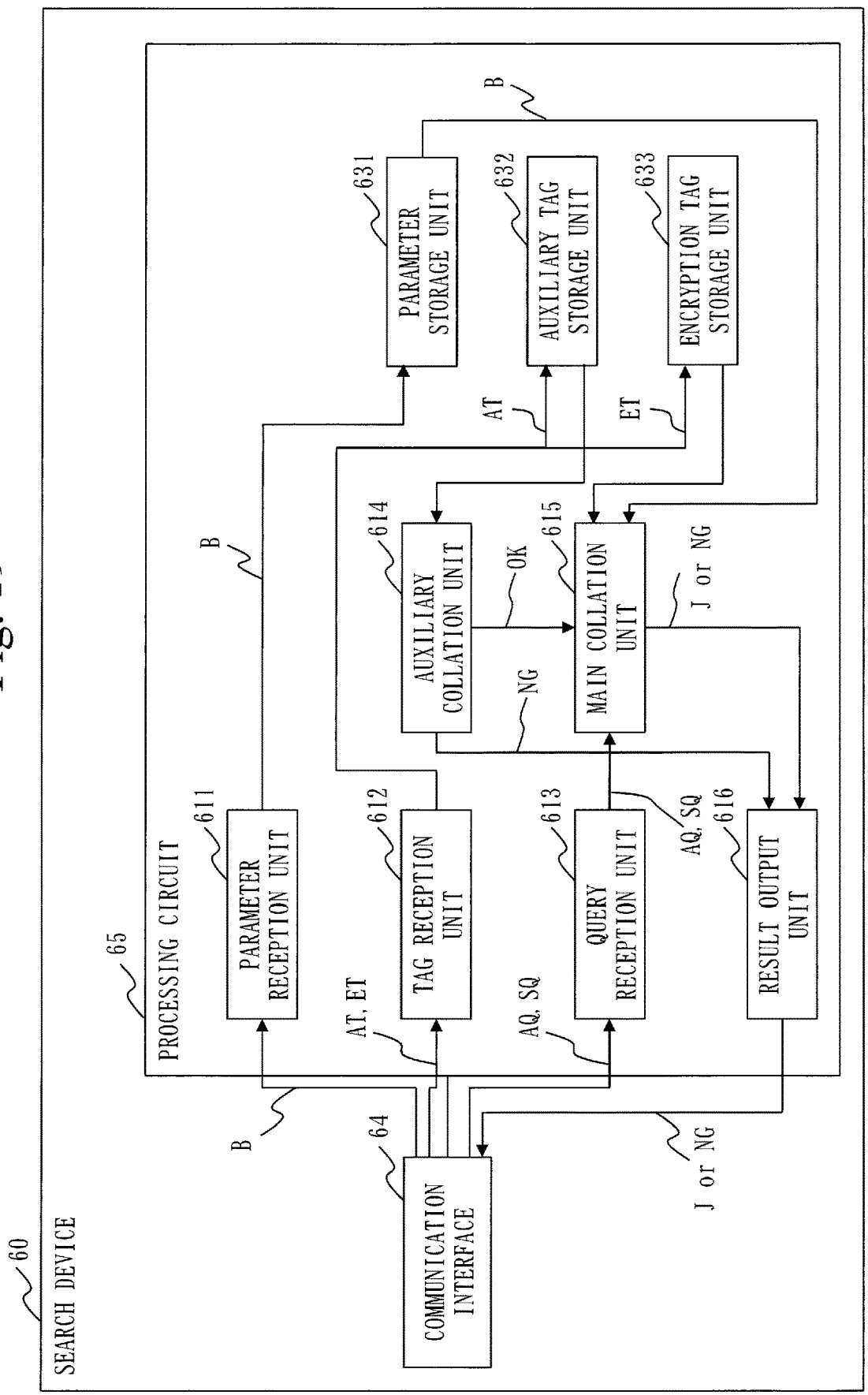
FIG. 19 is a configuration diagram of a search device 60 according to Modification 2.

A configuration of a search device 60 according to Modification 2 will be described referring to FIG. 19.

When functions are implemented by hardware, the search device 60 is provided with a processing circuit 65 in place of the processor 61, memory 62, and storage 63. The processing circuit 65 is a dedicated electronic circuit that implements the functional configuration elements of the search device 60 and the functions of the memory 62 and storage 63.

Each of the processing circuits 15, 25, 35, 45, 55, and 65 may be a single circuit, a composite circuit, a programmed processor, a parallel-programmed processor, a logic IC, a gate array (GA), an application specific integrated circuit (ASIC), or a field-programmable gate array (FPGA).

The functions of the functional configuration elements of the common parameter generation device 10 may be implemented by one processing circuit 15, or by a plurality of processing circuits 15 in dispersion. Likewise, regarding the auxiliary key generation device 20, the user key generation device 30, the tag generation device 40, the query generation device 50, and the search device 60, the functions of the functional configuration elements may be implemented by one processing circuit 25, one processing circuit 35, one processing circuit 45, one processing circuit 55, and one implemented by processing circuit 65, respectively; or the functions of the functional configuration elements may be implemented by a plurality of processing circuits 25, a plurality of processing circuits 35, a plurality of processing circuits 45, a plurality of processing circuits 55, and a plurality of processing circuits 65, respectively, in dispersion.

<Modification 3>

According to Modification 3, some function may be implemented by hardware and the remaining functions may be implemented by software. That is, of the functions of the functional configuration elements, some function may be implemented by hardware and the remaining functions may be implemented by software.

The processors 11, 21, 31, 41, 51, and 61; the memories 12, 22, 32, 42, 52, and 62; the storages 13, 23, 33, 43, 53, and 63; and the processing circuits 15, 25, 35, 45, 55, and 65 are collectively referred to as "processing circuitry". That is, the functions of the functional configuration elements are implemented by the processing circuitry.

REFERENCE SIGNS LIST

1: searchable encryption system; 10: common parameter generation device; 11: processor; 12: memory; 13: storage; 14: communication interface; 15: processing circuit; 111: security parameter reception unit; 112: parameter generation unit; 113: parameter transmission unit; 20: auxiliary key generation device; 21: processor; 22: memory; 23: storage; 24: communication interface; 25: processing circuit; 211: security parameter reception unit; 212: auxiliary key generation unit; 213: auxiliary key transmission unit; 30: user key generation device; 31: processor; 32: memory; 33: storage; 34: communication interface; 35: processing circuit; 311: parameter reception unit; 312: attribute reception unit; 313: random number generation unit; 314: user key generation unit; 315: user key transmission unit; 331: parameter storage unit; 40: tag generation device; 41: processor; 42: memory; 43: storage; 44: communication interface; 45: processing circuit; 411: parameter reception unit; 412: access condition reception unit; 413: search word reception unit; 414: random number generation unit; 415: auxiliary tag generation unit; 416: encryption tag generation unit; 417: tag transmission unit; 431: parameter storage unit; 50: query generation device; 51: processor; 52: memory; 53: storage; 54: communication interface; 55: processing circuit; 511: parameter reception unit; 512: keyword reception unit; 513: random number generation unit; 514: auxiliary query generation unit; 515: search query generation unit; 516: query transmission unit; 531: parameter storage unit; 60: search device; 61: processor; 62: memory; 63: storage; 64: communication interface; 65: processing circuit; 611: parameter reception unit; 612: tag reception unit; 613: query reception unit; 614: auxiliary collation unit; 615: main collation unit; 616: result output unit; 631: parameter storage unit; 632: auxiliary tag storage unit; 633: encryption tag storage unit; 70: transmission line

The invention claimed is:

1. A search device comprising:
   processing circuitry
   to count a correspondence number of auxiliary tags corresponding to an auxiliary query obtained by conversion of a keyword, among stored auxiliary tags generated by conversion of a search word by a tag generation device; and
   to specify an encryption tag corresponding to a search query being set with attribute information indicating an attribute of a user, and the keyword, among stored encryption tags generated by the tag generation device so as to be set with an access condition indicating an accessible attribute, and the search word, until a number of the specified encryption tags reaches the counted correspondence number, wherein
   at a time when the number of the specified encryption tags reaches the counted correspondence number, the processing circuitry is configured to end the specifying of the encryption tag corresponding to the search query, in order to reduce processing time in a cryptographic access control environment.

2. The search device according to claim 1,
   wherein the auxiliary tag is generated by inputting an auxiliary key and the search word to a target system that is a common key cryptosystem or a hash function and converting the search word, and
   wherein the auxiliary query is generated by inputting the auxiliary key and the keyword to the target system and converting the keyword.

3. The search device according to claim 2,
   wherein the processing circuitry specifies the encryption tag corresponding to the search query by performing pairing operation.

4. The search device according to claim 1,
   wherein the processing circuitry specifies the encryption tag corresponding to the search query by performing pairing operation.

5. A searchable encryption system comprising a tag generation device, a query generation device, and a search device,
   the tag generation device comprising processing circuitry:
   to generate an auxiliary tag by converting a search word; and
   to generate an encryption tag by setting an access condition indicating an accessible attribute, and the search word,
   the query generation device comprising processing circuitry:
   to generate an auxiliary query by converting a keyword; and
   to generate a search query by setting attribute information indicating an attribute of a user, and the keyword,
   the search device comprising processing circuitry:
   to store the auxiliary tag generated by the processing circuitry of the tag generation device;
   to store the encryption tag generated by the processing circuitry of the tag generation device;
   to count a correspondence number of auxiliary tags corresponding to the auxiliary query generated by the processing circuitry of the query generation device, among the stored auxiliary tags; and
   to specify an encryption tag corresponding to the search query generated by the processing circuitry of the query generation device, among the stored encryption tags, until a number of the specified encryption tags reaches the counted correspondence number, wherein
   at a time when the number of the specified encryption tags reaches the counted correspondence number, the processing circuitry of the search device is configured to end the specifying of the encryption tag corresponding to the search query, in order to reduce processing time in a cryptographic access control environment.

6. A non-transitory computer readable medium storing a search program that causes a computer to execute:
   an auxiliary collation process of counting a correspondence number of auxiliary tags corresponding to an auxiliary query obtained by conversion of a keyword, among stored auxiliary tags generated by conversion of a search word by a tag generation device; and a main collation process of specifying an encryption tag corresponding to a search query being set with attribute information indicating an attribute of a user, and the keyword, among stored encryption tags generated by the tag generation device so as to be set with an access condition indicating an accessible attribute, and the search word, until a number of the specified encryption tags reaches the correspondence number counted by the auxiliary collation process, wherein at a time when the number of the specified encryption tags reaches the counted correspondence number, the main collation process is configured to end the specifying of the encryption tag corresponding to the search query, in order to reduce processing time in a cryptographic access control environment.

* * * * *